(12) United States Patent
Woehler

(10) Patent No.: US 7,043,324 B2
(45) Date of Patent: May 9, 2006

(54) METHODS AND SYSTEMS FOR MODELING A BILL OF MATERIAL FOR A CONFIGURABLE PRODUCT

(75) Inventor: Christian Woehler, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/025,057

(22) Filed: Dec. 30, 2004

(65) Prior Publication Data

US 2006/0052896 A1 Mar. 9, 2006

(30) Foreign Application Priority Data

Aug. 20, 2004 (EP) .................................. 04077361

(51) Int. Cl.
*G06F 19/00* (2006.01)

(52) U.S. Cl. ........................... 700/107; 705/28; 705/29; 705/404; 703/2; 717/104

(58) Field of Classification Search ................ 700/107; 705/29, 404, 28; 703/2; 717/104
See application file for complete search history.

(56) References Cited

U.S. PATENT DOCUMENTS

| | | | | |
|---|---|---|---|---|
| 5,311,424 A | * | 5/1994 | Mukherjee et al. | 705/29 |
| 6,223,094 B1 | * | 4/2001 | Muehleck et al. | 700/107 |
| 2002/0143669 A1 | * | 10/2002 | Scheer | 705/28 |
| 2003/0009410 A1 | * | 1/2003 | Ramankutty et al. | 705/37 |

* cited by examiner

*Primary Examiner*—Leo Picard
*Assistant Examiner*—Sheela S. Rao
(74) *Attorney, Agent, or Firm*—Finnegan, Henderson, Farabow, Garrett & Dunner, L.L.P.

(57) ABSTRACT

The invention relates to a method of modelling a bill of materials for a configurable product in a managed supply chain and a modeller apparatus for modelling a bill of materials for a configurable product in a managed supply chain. The method comprises: storing data relating to the product, wherein the data includes at least one product characteristic specifying a plurality of component products of the product and an additional characteristic specifying a selection condition relating to the at least one product characteristic, combining the at least one product characteristic and the additional characteristic to generate a characteristic value combination, using the characteristic value combination to model the bill of materials, and using the bill of materials to control the supply of the product. The invention further relates to a computer system, a user terminal and a program storage device readable by a processing apparatus.

14 Claims, 5 Drawing Sheets

METHODS AND SYSTEMS FOR MODELING A BILL OF MATERIAL FOR A CONFIGURABLE PRODUCT

RELATED APPLICATIONS

This application is based upon and claims the benefit of priority from prior patent application EP 04077361.6, filed Aug. 20, 2004, the entire contents of each are expressly incorporated herein by reference.

BACKGROUND

I. Technical Field

The present invention relates to a method of modelling a bill of materials for a configurable product in a managed supply chain and a modeller apparatus for modelling a bill of materials for a configurable product in a managed supply chain. The invention further relates to a computer system, a user terminal and a program storage device readable by a processing apparatus.

II. Background Information

Demand planning is used to forecast the demand for products. One object of demand planning is to plan the demand of products with respect to other product independent characteristics, for example, sales regions, customer channel and location etc. Another object of demand planning and characteristics based forecasting (CBF) is to plan the demand of complex products and their components. This is done by introducing product dependent characteristics for the complex products. An example of a complex product is a computer for which the characteristics computer memory, configuration, hard disc etc, are defined. A complex product is a product having at least one product dependent characteristic, for example, computer memory, configuration, hard disc etc.

Demand planning applications are typically provided on a computer system. Typically, they form a component or module of a supply chain management application, which runs on a computer.

Conventionally, the supply chain management application comprises a number of applications including the demand planning application and the product planning application. Demand planning involves only the planning with respect to characteristics, that is one characteristic for the complex product—or more specifically—the configurable product. A configurable product is a product, for example a personal computer (PC), of which different variants are available. Production planning, on the other hand, involves planning with respect to "real" characteristics, such as product and location.

Conventionally, in order to calculate the materials necessary to make the configurable product the bill of materials (BOM) for the configurable product is required and the BOM has to be exploded in the production planning application.

One drawback of this conventional approach is that it requires the creation and maintenance of the bill of material and its explosion in different software components. This renders the process difficult to implement and support. Further, this approach when implemented has drawbacks for the user because it is slow and provides limited information to the planner.

A further conventional approach is a technique called characteristics based forecasting (CBF), in which characteristics are used in order to describe the components on the product level. One drawback of this further conventional approach is that it does not include the modelling of the object dependencies. For example, a product may include a dependency such as "if the colour is X, then the colour is Y". Thus, for products where the object dependencies are relevant, this approach is not suitable.

Further, the logistic chain of products between a supplier and end user of the products is compromised. In particular, the control of the supply of goods is compromised. The present invention addresses the problems of optimizing the logistic chain of products between a supplier and an end user of the products. It is a further object to improve the logistic chain with the purpose of keepings costs, including the cost of the products, down. It is a yet a further object to make the supply of products more efficient.

The problems with conventional approaches compromise the accuracy of the demand planning. Further, the accuracy, speed and ease with which the user can use the system are compromised. In particular, it is an object of the present invention to improve the speed with which the demand plan can be generated. It is a further object to improve the accuracy with which the supply of a product in the supply chain can be controlled.

SUMMARY

According to a first aspect of the invention, there is provided a method of modelling a bill of materials for a configurable product in a managed supply chain, the method comprising: storing data relating to the product, wherein the data includes at least one product characteristic specifying a plurality of component products of the product and an additional characteristic specifying a selection condition relating to the at least one product characteristic, combining the at least one product characteristic and the additional characteristic to generate a characteristic value combination, using the characteristic value combination to model the bill of materials, and using the bill of materials to control the supply of the product.

In this way the bill of materials is modelled using characteristics based forecasting. Thus, it is no longer necessary to create and maintain the bill of materials in a separate software component. Thus, the process is easier to implement, support further it is faster and provides more information to the planner. Further, the control of the supply of the product from the supplier to the user is improved. The invention provides the further advantages that computer memory is saved, as well as CPU time.

According to a second aspect of the present invention, there is provided a computer system comprising: a processor device; a planning tool configured to run on the processor device for generating a demand plan for a configurable product in a managed supply chain; a data storage system for storing data relating to the product, wherein the data includes at least one product characteristic specifying a plurality of component products of the product and an additional characteristic specifying a selection condition relating to the at least one product characteristic, wherein the planning tool includes a modelling tool configured to run on the processor device for generating a model of a bill of materials for the configurable product, wherein the modelling tool is operatively associated with the data storage system and the processor device to combine the at least one product characteristic and the additional characteristic to generate a characteristic value combination, and to use the characteristic value combination to model the bill of materials, wherein the bill of materials is used to control the supply of the product.

According to a third aspect of the present invention, there is provided a modeller apparatus for modelling a bill of materials for a configurable product in a managed supply chain, wherein the product has at least one product characteristic specifying a plurality of component products of the product and an additional characteristic specifying a selection condition relating to the at least one product characteristic, wherein the modeller is operatively associated with a data storage system to store the at least one product characteristic and the additional characteristic, the modeller further comprising a storage medium having recorded therein processor readable code processable to model a bill of materials for the configurable product, the processor readable code comprising combining code for combining the at least one product characteristic and the additional characteristic to generate a characteristic value combination, and using code for using the characteristic value combination to model the bill of materials, wherein the bill of materials is used to control the supply of the product.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
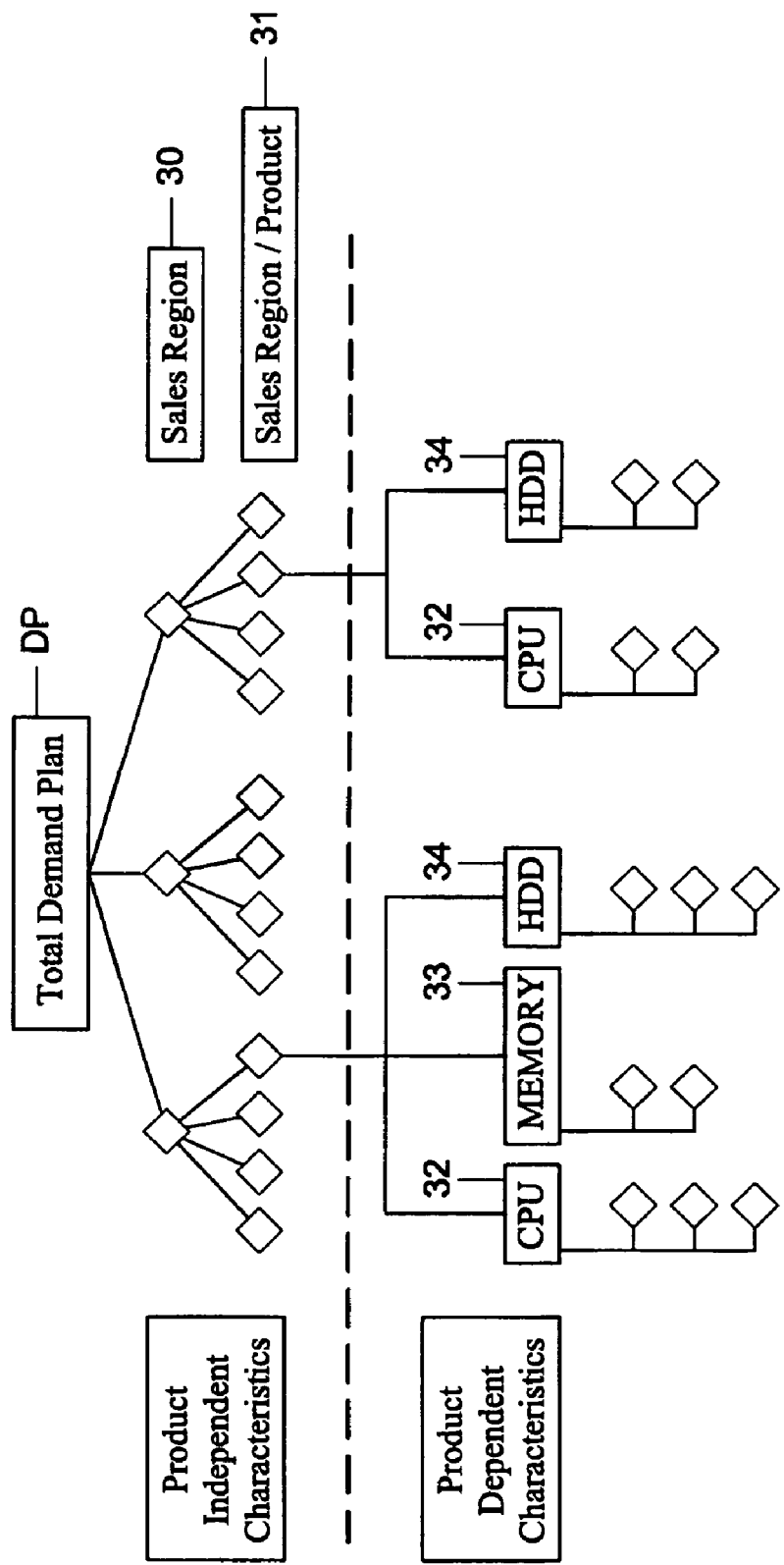
FIG. 1 shows a structure of characteristics in a supply chain for configurable products and components.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

In demand planning or long term planning, characteristics and corresponding characteristic values can be used to describe in a general and flexible way the supply chain. Characteristics of different types describe different aspects of the material distribution. Some examples of characteristics include geographical aspects which are described, for example, by sales region or location, customer aspects which are described, for example, by customer group, or product aspects which are described, for example, by product family.

Characteristic value combinations (CVC) are a variable number of uniquely specified characteristic values, for example, sales region: USA and customer channel: internet sales. In demand planning, if all the characteristics used in the supply chain model are specified the CVC is referred to as a detailed CVC. The characteristic value combinations may be stored in the demand planner as master data.

The characteristics are used to model the supply chain. Although it is possible to change the characteristics at a later point in time, typically, they are usually not changed later. The values however can change. For example, if a new product is introduced, this may lead to new CVC. The detailed CVC are master data and within a supply chain management application, for example, a supply chain management application provided by SAP AG, time series are assigned to the data. The master data representing the CVC describe the demand plan values in a particular format. In the particular format, it is possible to define selections. Selections are typically not detailed CVC but specify, for example, only a reduced number of characteristics and represent an aggregate of detailed CVC for the reduced number of characteristics. The aggregate being a summed value of the characteristics. Within the selected CVC the planning is consistent. This means that the demand plan values can be displayed and changed on different levels, for example, on a product group level as well as on a product or other level, and the changes are automatically propagated to the detailed CVC data. Downward propagation is called a disaggregation calculation and upward propagation is an aggregation calculation. The hierarchy with which the data are modelled is flexible and can be changed interactively by navigating using a graphic user interface through the selected data in different ways. For example, changing the number of a particular product planned in the next month for one product leads to consistent changes in the different sales regions where the product is sold. On the other hand changing the number for one sales region changes the values for the products sold there.

The characteristics described hereinabove, including the product characteristic, are called product independent characteristics (PIC).

Further characteristics called product dependent characteristics (PDC) may also be defined. In contrast to the product independent characteristics (PIC), the product dependent characteristics (PDC) are defined specifically for one product. The number of these characteristics can be quite large and they can change over time, for example a characteristic may be added. For example, if assembled finished products which are manufactured with components are considered, it will be appreciated that the assembled products are complex and can be manufactured in many different variants. For such configurable products, it is useful to introduce configurable products which are specified by an evaluation. The evaluation is defined by using product dependent characteristics and by specifying their values uniquely for each characteristic. Typical examples of product dependent characteristics are defined, for example, for automobiles which may have product dependent characteristics such as colour or engine size or for computers which may have product dependent characteristics such as memory size and/or hard disc, since automobiles and computers may be manufactured in many different variants. As with product independent characteristics, product dependent characteristics have a CVC, that is a variable number of uniquely specified characteristic values.

FIG. 1 shows a structure of characteristics in a supply chain for configurable products and components. In particular, FIG. 1 shows a total demand plan DP. In order to determine the total demand plan, product independent characteristics PIC are used such as "sales region" 30, "sales region/product" 31, etc. The product independent characteristics are modelled using standard demand planning. The total demand plan DP is generated taking into account product dependent characteristics PDC, such as "CPU (central processing unit)" 32, "memory" 33 and "HDD (hard disc drive)" 34, etc. The product dependent characteristics are modelled using characteristics based forecasting.

Figure 2:
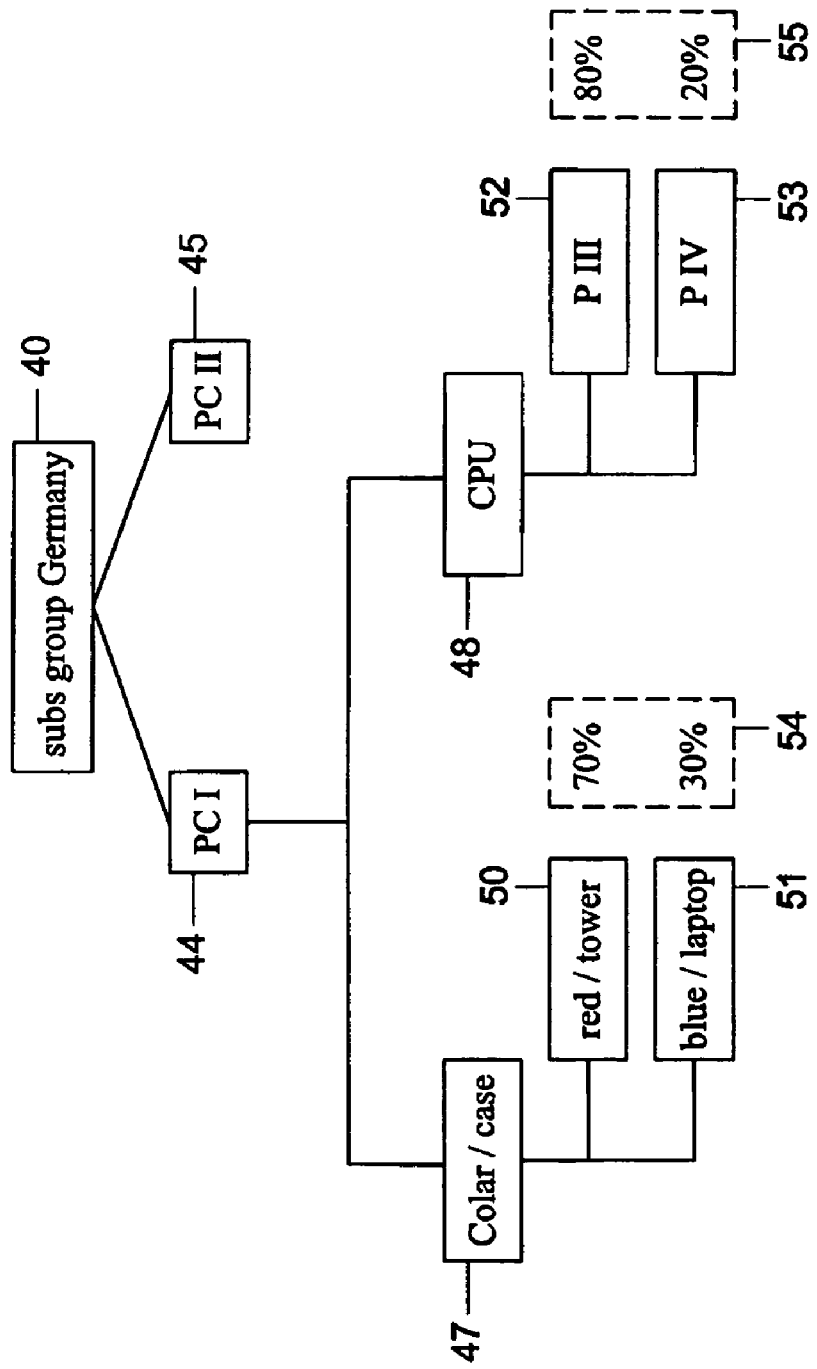
FIG. 2 shows an example of a consistent characteristics based forecasting planning in demand planning.

FIG. 2 shows an example of a consistent characteristics based forecasting planning in demand planning. For the sales group "Germany" 40, it is desired to plan on the planning level 42 for two products: PC1 44 and PC2 45. It is desired to plan for 100 PC1 computers 44. The PC1 computer 44 has three product dependent characteristics: "color/CASE" 47 and "CPU" 48. It is planned that each PC1 computer has a "color/CASE" 47 and "CPU" 48. Hence, 100% of PC1 computers have a color/case and 100% of PC1 computers have a CPU. The characteristics have characteristic values 49: the color/CASE may have the characteristic value "Red/Tower" 50 or "Blue/Laptop" 51. Further, the CPU may have the characteristic value "PIII (Pentium III)" 52 or "PIV (Pentium IV)" 53. It is planned for the PC1 computers that 70% are a red tower and 30% are a blue laptop. It is further planned for the PC1 computers that 80% have a PIII chip and 20% have a PIV chip. In FIG. 1, the consistency calculation is shown, that is the upward and downward propagation of changes for absolute values. Further, the transactional data is stored on the level of the characteristic values.

In demand planning a demand plan is modelled for a supply chain of configurable products including their components. An embodiment of the present invention uses a component called characteristics based forecasting (CBF). CBF is a component of a software product for supply chain management called SAP Advanced Planner and Optimizer (SAP APO). CBF enables a user to define a profile for any product. The profile has a predetermined structure. For example, the profile contains profile planning tables (PPT) which have as entries the CVC of one or more product dependent characteristics (PDC). The structure allows entries to be made in lines, table rows or the like. The profile planning tables are stored in a storage element, for example an object-oriented database, such as LiveCache, which is the storage system of the APO.

The structure of the profile planning tables is general. For example, it is possible to use the same characteristic in different profile planning tables.

Characteristics which are in one profile planning table are called dependent characteristics and if they are in a plurality of different profile planning tables they are called independent characteristics. The reason for this is that the demand plan values are stored on the level of the PPT lines only and if the value for a CVC which contains independent characteristics is to be displayed the result is calculated by multiplying the corresponding proportions. For example, if 50% of a car model are red and 10% have four doors, then the number of red cars with four doors is calculated to be 5%. This however, need not be precise if there is a straong correlation between colour and the number of doors of the car. The calculation of the result assumes that the characteristics are statistically independent. If this is not the case and the statistical error is not acceptable the corresponding characteristics have to be planned in one profile planning table. The combination of different characteristic values however usually increases the number of profile planning table lines and with it the amount of data stored in the storage element, such as the LiveCache.

The CBF component provides an automatic transformation between the product's product dependent characteristics which are used in demand planning and the internal characteristics for profile, planning table, and the planning table rows which define the manner in which the data are stored.

After generating the demand plan it is possible to release the data from the Demand Planning component to the Production Planning component and explode there the BOM according to the demand plan values of the CVC of the product dependent characteristics.

Typically, the relation between assembled products and their components is specified in the bill of material (BOM). This is a complete list of all possible input products. Selection conditions describe when an input product is required for the manufacturing of the finished product. The selection conditions define particular conditions for different product dependent CVC which have to be met by the evaluation in order to consider the corresponding input product for production. These conditions can be very complicated when several different characteristic values are related by different logical operators, such as "and" or "or". However, they may also considered as being transformable into a disjunctive normal form which specifies only different CVC and connects them in a particular way with "and" and "or" relations. In particular, the disjunctive normal form connects conjunctions only by the "or" relation and the conjunctions consist of unique characteristic value specifications which are connected by the "and" relation.

As mentioned above, in conventional supply chain management, the BOM is "exploded", that is the list of materials is obtained, in the production planning when the requirements for the assembled product are to be fulfilled and all the components and activities are determined in order to achieve this. After the explosion all the required components are calculated and their procurement can be triggered.

Thus, in this way, it is possible to plan in Demand Planning the product independent characteristics and the product dependent characteristics and use the BOM to relate the components on a material level to the forecast of the assembled product. However, it has been found that often the product dependent characteristics evaluated in the selection conditions of the BOM are too technical and too complicated to be used in demand planning. Instead, according to an embodiment of the present invention, the components are modelled with an additional introduced product dependent characteristic or characteristics which is or are defined to directly describe the components without using selection conditions. Further, it has been found that the BOM usually contains too much information for planning the relevant components only. Relevant components are components which are either very valuable, have to be procured in advance or specify an important feature of the finished product. In contrast to this the BOM specifies all the possible components including bulk materials. Further, the BOM is an additional object of Production Planning and is alien to demand planning. Thus, the BOM explosion does not allow a consistent planning of the components in real time. In demand planning, it has been found that the user seems to face the situation that either a BOM already exists but it is not suitable for an efficient demand planning including the components or that he has to create a BOM only for relating the components to the assembled product in the production planning.

It is commented that in Demand Planning the component, demand planning bill of materials (DP BOM) exists which employs a simplified BOM in order to model fixed relations between output, i.e. assembled, and input products, i.e. components. This functionality however cannot be used to actively plan the components for the assembled products since the relation is always fixed and it is used only for disaggregation: the value for the output product is entered and leads to a fixed value for the input products. This means that it is not possible to use the DP BOM functionality for planning configurable products for which the output-input relation has to be flexible. Also, in the DP BOM, the input products are represented strictly on the product level and therefore it does not allow to model groups of similar components, for example, assembly groups.

According to an embodiment of the present invention, there is provided a demand planning of assembled products including the components. It uses an additionally defined PDC in such a way that the BOM is directly modelled using only demand planning CVC. This is achieved using a component oriented logic and the component oriented availability check. The component oriented logic enhances the conventional consistency for product dependent characteristics, which is also valid for product independent characteristics, and requires that the sum of the values for all the characteristic values of one product dependent characteristic is the same for all the product dependent characteristics of the same product and it is also equal to the total of assembled products. The conventional consistency is a typical feature of demand planning characteristics but, it has been found that it is too restrictive to plan on the component level. The component oriented availability check enhances the availability check of the quotation against demand planning CVC in such a way that it is possible to effectively check the availability of assembled products and their components. Both of the two functionalities are useful in order to take correctly into account that the CVC are used to model components of an assembled product.

The present invention uses the concepts mentioned above and uses characteristics in demand planning as far as possible in order to model the assembling of finished products. This is achieved using a more general concept which is not refined to any specific implementation in the demand planning application or the production planning application. In particular, according to an embodiment of the present invention, CVCs are used in order to model assembled products and the relation to their components without relying on additional objects, such as the BOM with its components. Further, selection conditions as an independent object are substituted by a system of CVC comprising product dependent characteristics.

The consistency calculation for the CVC substitutes the BOM explosion, that is the component demands are derived from the demand for the finished product and its characterization.

The present invention, which also includes the modelling of the selection conditions, is beyond a mere output-input relation on product level. In the following the general rules how to define the system of CVC in order to model the BOM are described. The description also includes how the aggregation and disaggregation calculation and the characteristic consistency calculation are able to model the BOM explosion.

The advantages of the present invention is that the whole supply chain from global aspects up to the last relevant components can be described consistently within one system of CVC. Product independent characteristics and product dependent characteristics can be used in order to forecast the demand, for example, for a particular sales region and derive from this the number of components which have to be procured. It is possible to use historical data together with forecasting methods to calculate the numbers on the detailed level and possibly check them immediately against restrictions of procurable components. If there is a conflict the demand plan can be adjusted and checked again in real time. The substitution of the BOM by product dependent characteristics has also the advantage that more information about the finished product and component relation are available: the aggregation calculation directly propagates changes on the component level to the finished product level and even further upward to the product independent characteristics.

The core demand planning process is finished with the creation of the global demand plan for the assembled products and their components. It remains to extract the relevant data from the demand planning application and use the results in order to trigger the procurement or the manufacturing of the components in the required number or to analyze or process them for a different objective. This is partly possible by using standard data extraction functionality of the demand planning application. However, in addition to defining the appropriate extraction level which gives the demand plan values on the component level, according to an embodiment of the present invention, the characteristic values of the component product names are mapped to the appropriate objects which contain the product names. After this the demand plan results are transformed to requirements for certain location products and certain dates. Typically, the results will be sent to other components or systems used for the executing the further processing of them.

The modelling of the bill of materials with characteristic value combinations is hereinbelow described according to an embodiment of the present invention.

The modelling of the BOM with product dependent characteristics is carried out in the following way. The CBF profile is used to describe the BOM structure and the profile planning tables are defined so that each table describes one group of components, that is an assembly group. A group of components is a set of similar components which are different specifications of the same feature. For example, the different possible engines of a car as products are a group of components with respect to the feature "engine of the car".

The characteristics of each profile planning table preferably comprises comprise one characteristic for the product name. Other characteristics can be added to the profile planning table for the product description from the material master and for other product descriptions which are more appropriate for demand planning. The relation between the characteristic values for the different characteristics of one profile planning table mentioned so far is one to one, i.e. the product name corresponds unambiguously to one value for any of the product descriptions and one product description specifies uniquely one product name. Therefore, preferably, every characteristic value occurs only once for each characteristic in the profile planning table.

There are also other, additional characteristics for which the values occur more than once in the lines of the profile planning table. They represent only an incomplete characterization of the component which does not determine the component unambiguously. They are useful to further group the components in order to e.g. allow for an aggregated or grouped representation. An example of an incomplete characterization can be the CPU of computers which have an additional characteristic of "brand" with the values "Intel" and "AMD", which are manufacturers of computer components. The brand does not specify uniquely the CPU type for which more information is required, for example, the tact frequency, but it allows the user to aggregate the demand plan data on the level of the CPU brand and thus to display, analyze, and maintain them on separately for the Intel CPU and AMD CPU.

Figure 3:
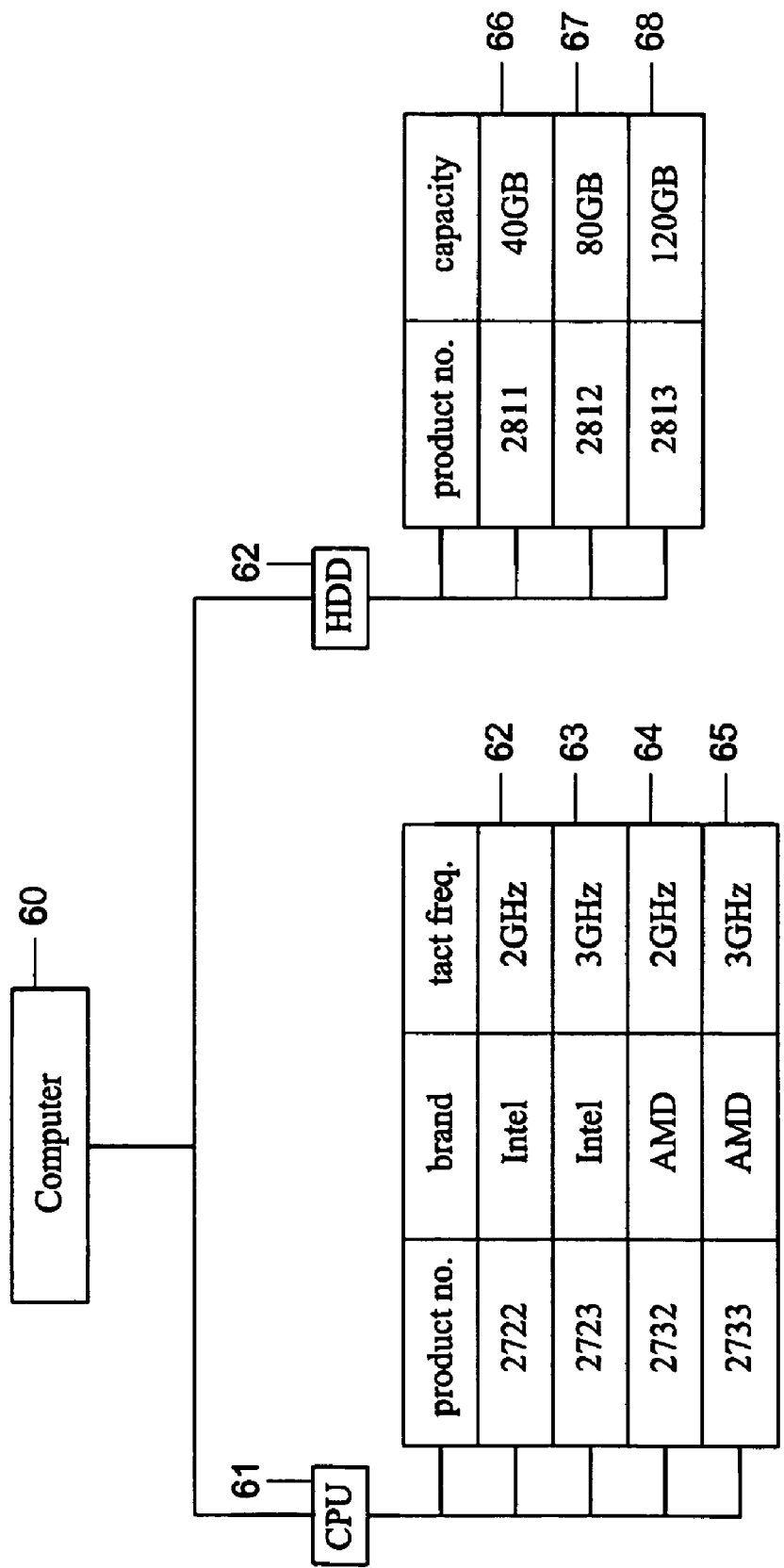
FIG. 3 shows a how a consistency calculation simulates a bill of materials explosion.

Further, reference is made to FIG. 3 which shows how the consistency calculation simulates a BOM explosion. FIG. 3 shows a product 60, which is a computer. The computer has a CPU 61 and a hard disk drive 62. The CPU may be one of four variants 62, 63, 64 and 65. The variants are identified as having product numbers 2722, 2723, 2732 and 2733, respectively. The hard disk drive 62 may be one of three variants 66, 67, 68. The variants are identified as having product numbers 2811, 2812 and 2813. In particular, FIG. 3 shows a disaggregation calculation after an input of a value for a computer and a calculation of the values for product no. 2722, 2723, 2743 and 2733 according to defined ratios. This simulates a BOM explosion. FIG. 3 further shows how specification of, for example, Intel (Trademark) chips and calculation of the values for product no. 2722 and 2723 correspond to a BOM explosion taking the selection condition into account, as also described hereinabove.

A further function of the additional characteristics, such as the additional characteristic "brand", is the modelling of the selection conditions of the object dependencies in the BOM. As mentioned above the selection conditions are based on the evaluation characteristics of the configurable product and the evaluation characteristics can be the relevant characteristics also in Demand Planning. This can mean the user prefers to work with the additional characteristics and is less interested in the product name of the component. It can also be used in order to map the sales orders with their evaluations to the component demands required to assemble the sold finished products. With the appropriate definition of the additional CVC in the profile planning table it is then possible to model the disjunctive normal form of the selection condition which is the allowed kind of object dependency. In particular, with the additional CVC it is possible to model all kinds of disjunctive normal forms and that the selection conditions which are considered in this context can always be transformed into a disjunction normal form, i.e. there is no restriction implied in the present modelling. It is the combination of the product characteristics specifying the component products and the additional characteristics describing the selection conditions which allows the substitution of the BOM and the BOM explosion by the CVC and the consistency calculation. Further, the consistency calculation allows also the "inverted" BOM explosion which means that changing the values on component product level changes accordingly the values on selection condition characteristics level.

The selection condition is modelled in the following way: the characteristics of the conjunctions, that is the characteristics which are connected by an "and" operator have all to be defined within the profile planning tables. One line of the profile planning table represents then the conjunction where the product name is specified in the product characteristic and the additional characteristic values are the ones from the respective conjunction. If the selection conditions contains more than one conjunction, that is also "or" relations, another line is added to the profile planning table for the same product name but it is different in that the additional characteristics represent again the different conjunction. In this way one component after the other of the assembly group with its individual selection condition can be added to the profile planning table. It has further been found that adding the individual selection conditions may be cumbersome if the conjunctions contain many different characteristics. In this case the profile planning table can become large. To overcome this particular problem, it has been found that if different characteristics are specified in the conjunctions, in addition representative values are introduced for the non-specified characteristic values of the conjunctions.

An example for modelling such a selection condition is given below for the assembly group "CPU" and for the product "3711" with the description P4-3 GHz (which is a type of CPU) and the selection condition defines: take this component if CPU-brand=Intel and frequency=3 GHz or if edition=high end. The profile planning table for the assembly group CPU and the characteristics CPU-product, CPU-description, CPU-brand, CPU-frequency, and CPU-edition then contains the following two lines: CPU-product/3711, CPU-description/P4-3 GHz, CPU-brand/Intel, CPU-frequency/3 GHz, CPU-edition/unspecified and CPU-product/3711, CPU-description/P4-3 GHz, CPU-brand/unspecified, CPU-frequency/unspecified, CPU-edition/high end. In this example it can be seen how different selection condition characteristics add up in the profile planning table of the assembly group.

In order to show how the consistency calculation works between the product characteristics and the additional characteristics, the following examples are given. Let it be assumed that a product occurs in the profile planning table in several lines and there are more than one additional characteristic. Entering a value for the product then results in a disaggregation of the value to all the lines of the profile planning table where the component product is defined. The disaggregation can be according to different rules, for example, a pro rata disaggregation or a disaggregation with respect to a different key figure. This is not important since the disaggregation logic is the same as in the standard demand planning application. However, according to an embodiment of the invention, the changes are correctly propagated to all CVC of the additional characteristic according to the new value for the component product. Further, this is carried out in real time. In addition to the disaggregation calculation to the detailed CVC the aggregation calculation with respect to the displayed data also propagates the change. If, after the change of the value of the component product, for example, one additional characteristic value which is also specified in the additional CVC of the changed component product is selected and displayed all the lines of the profile planning table which match this characteristic value are aggregated and incorporate the propagated change to the detailed CVC. On the other hand if now the value for the one selected additional characteristic value is changed all the component products for which the additional CVC matches this value are changed according to the proportions by which they contribute to the changed characteristic value.

A further example is given to further illustrate the embodiment described above. The example of a configurable computer is given. The computer can have different CPU values which describe a group of components. There are also two additional characteristics which are "processor type" and "tact frequency". The following three components are considered here: product 4711 with type P3 and frequency 1 GHz, product 4712 with type P4 and frequency 2 GHz, and product 4713 with type P4 and frequency 3 GHz. If the demand plan value for product 4711 is changed from 0 to 100 the change is directly written to the first additional CVC and the value for P3 is also raised from 0 to 100—as it is the case for 1 GHz. If the value for P4 is changed from 0 to 100 the change is disaggregated to the two last CVC by e.g. giving each combination the value of 50. The result is that the number of product 4712 is raised from 0 to 50 and of product 4713 from 0 to 50. Further examples of more complex configurable products work in the same way and it can be seen that the consistent calculation is able to map correctly between the component product name and the additional CVC describing the selection condition. The consistent calculations are very efficient and are able to propagate changes to many profile planning tables which also contain a large number of lines.

Figure 4:
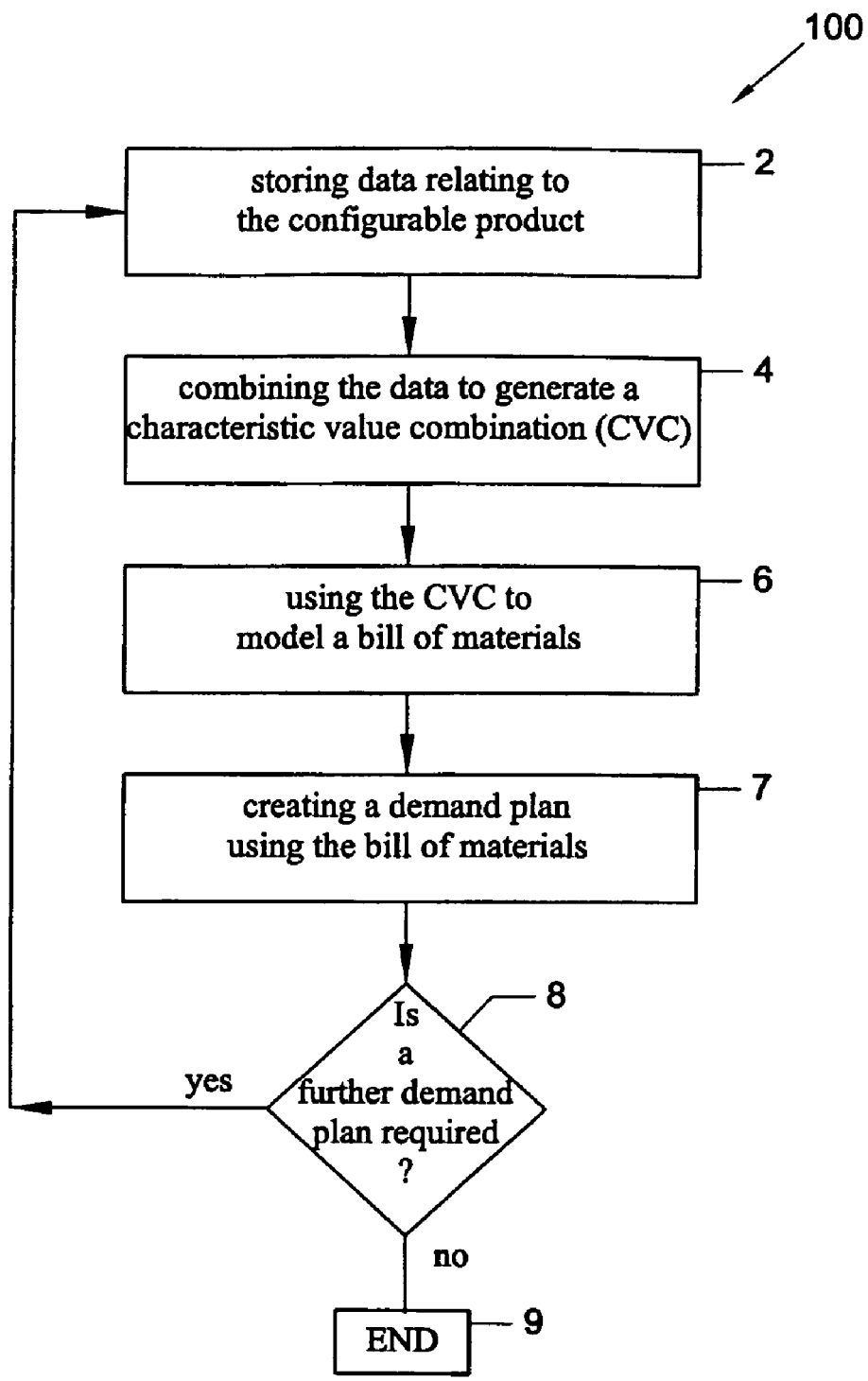
FIG. 4 shows a flow chart showing a modelling of a bill of materials in accordance with an embodiment of the present invention.

As can be seen in FIG. 4, a process 100 is shown including the steps carried out in order to model the bill of materials. The process includes the steps of storing data relating to the configurable product (step 2), combining the data to generate a characteristic value combination (CVC) (step 4), using the CVC to model a bill of materials (step 6), creating a demand plan using the bill of materials (step 7). Subsequently, it is enquired whether a further demand plan is required (step 8). If a further demand plan is required, the process 100 returns to step 2. If no further demand plan is required, the process ends (step 9). The bill of materials modelled is subsequently used to control the supply of the product. For example, the supply of the product from a supplier to a user.

In further embodiments of the invention further process steps are carried out as further described.

According to an embodiment of the present invention, there is provided a method of modelling a bill of materials for a configurable product in a managed supply chain, the method comprising: storing data relating to the product (step 2), wherein the data includes at least one product characteristic specifying a plurality of component products of the product and an additional characteristic specifying a selection condition relating to the at least one product characteristic, combining the at least one product characteristic and the additional characteristic to generate a characteristic value combination (step 4), using the characteristic value combination to model the bill of materials (step 6), and using the bill of materials to control the supply of the product. In this way, a bill of materials can be modelled using characteristics based forecasting. Thus, the bill of materials can be modelled within the demand planning application without requiring interaction with the production planning application.

In a further embodiment, a consistency calculation is performed. The consistency calculation may be carried out in real time. In this way, the process takes place faster than conventional bill of material modelling.

Further, the method may comprise modelling the selection condition of an object dependency in the bill of materials using the additional characteristic.

A further embodiment comprises using the bill of materials to generate a demand plan with respect to the configurable product and the plurality of component products of the configurable product. In this way a demand plan is created without reference to a further software component, such as a production planning application. In a further embodiment, the consistency calculation may be used in the disaggregation of the bill of materials.

Figure 5:
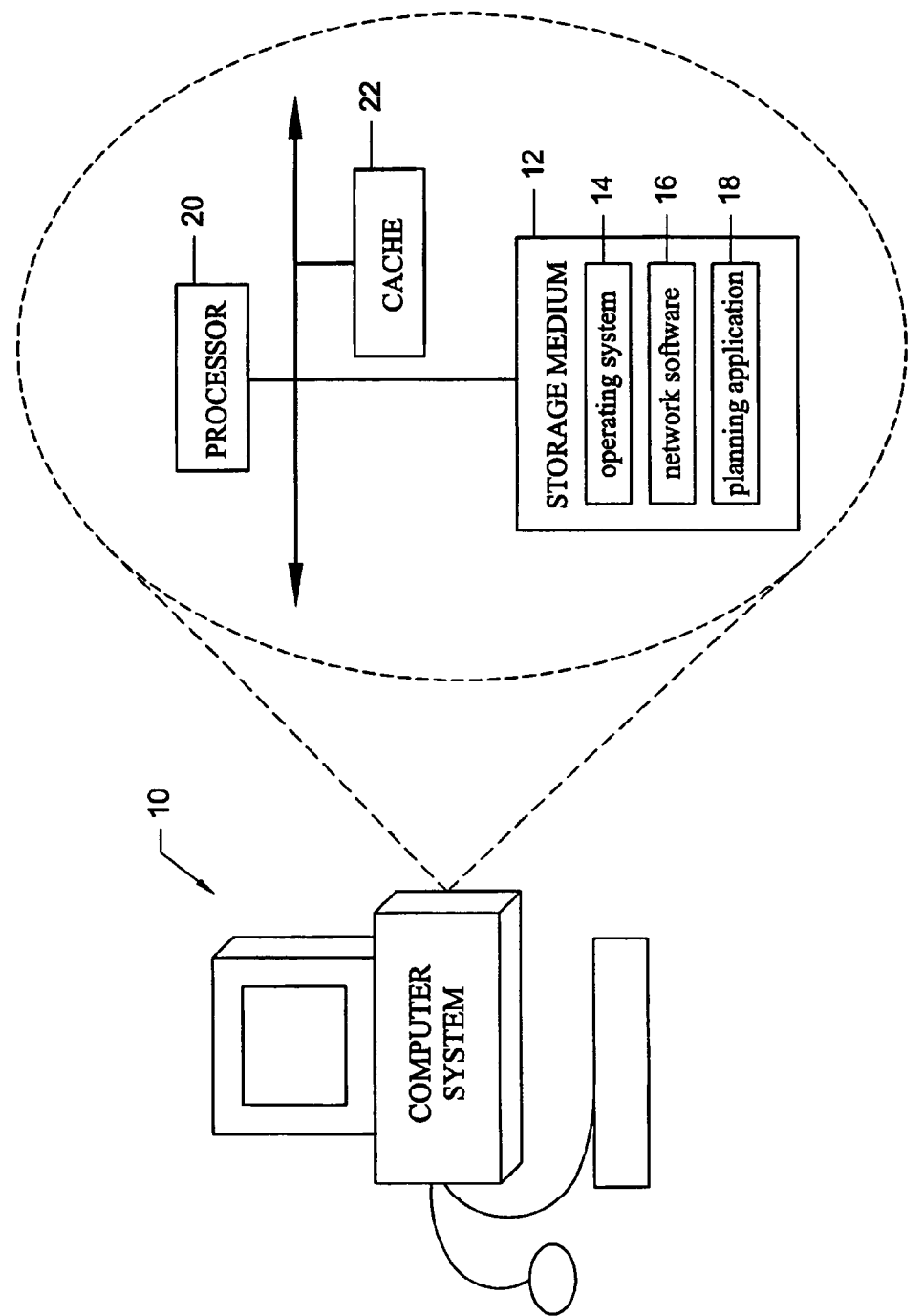
FIG. 5 shows a block diagram of a computer that runs software for managing a supply chain.

FIG. 5 shows a block diagram of a computer system 10 that runs software for managing a supply chain. The computer system 10 comprises a hard disk 12 that stores software, such as operating system software 14 and network software 16 for communicating over a network. The hard disc 12 also stores other software, including, but not limited to, planning application 18. The planning application comprises a modelling application (not shown). In this embodiment, processor 20 executes planning application to perform the functions described. Planning application 18 comprises various software routines for use in supply chain management. To this end, planning application 18 may include a demand planning application including a modelling application. The planning application 18 uses data relating to a configurable product or products. In particular, the modelling application uses data relating to the product or products to model a bill of materials. The data includes the characteristics described above. In this embodiment, demand plans are stored as data objects in a cache 22 on computer system 10. The cache 22 may for example be the LiveCache described. The characteristics are stored in a data storage system (a database), such as hard drive 12 on computer system 10 or elsewhere. Pointers are comprised in the data objects in the cache 22 to the characteristics in the data storage system. Although the data objects and characteristics are stored on the same machine in the embodiment shown, they may be stored on different machines that are connectable to each other, via, for example, a network, communications link or the like.

In accordance with one embodiment of the present invention, there is provided a computer system 10 comprising a processor device 20; a planning tool configured to run on the processor device 20 for generating a demand plan for a configurable product in a managed supply chain; a data storage system 12, 22 for storing data relating to the product, wherein the data includes at least one product characteristic specifying a plurality of component products of the product and an additional characteristic specifying a selection condition relating to the at least one product characteristic, wherein the planning tool includes a modelling tool configured to run on the processor device for generating a model of a bill of materials for the configurable product, wherein the modelling tool is operatively associated with the data storage system and the processor device to combine the at least one product characteristic and the additional characteristic to generate a characteristic value combination, to use the characteristic value combination to model the bill of materials. Further, the bill of materials may be used to control the supply of the product. In particular, from a supplier to a user.

With respect to the planning application, according to one embodiment of the present invention, there is provided a modeller apparatus for modelling a bill of materials for a configurable product in a managed supply chain, wherein the product has at least one product characteristic specifying a plurality of component products of the product and an additional characteristic specifying a selection condition relating to the at least one product characteristic, wherein the modeller is operatively associated with a data storage system to store the at least one product characteristic and the additional characteristic, the modeller further comprising a storage medium having recorded therein processor readable code processable to model a bill of materials for the configurable product, the processor readable code comprising combining code for combining the at least one product characteristic and the additional characteristic to generate a characteristic value combination, and using code for using the characteristic value combination to model the bill of materials, wherein the bill of materials is used to control the supply of the product.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removeable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims and their full scope of equivalents.

What is claimed is:

1. A method of managing a supply chain, the method comprising:
   storing data relating to a product, wherein the data includes at least one product characteristic specifying a plurality of component products and an additional characteristic specifying a selection condition relating to the at least one product characteristic;
   combining the at least one product characteristic and the additional characteristic to generate a characteristic value combination;
   using the characteristic value combination to model a bill of materials; and
   using the modeled bill of materials to control a supply of the product.

2. The method according to claim 1, comprising:
   performing a consistency calculation to model the bill of materials.

3. The method according to claim 2, wherein the consistency calculation is performed in real time.

4. The method according to claim 1, comprising:
   modelling the selection condition of an object dependency in the bill of materials using the additional characteristic.

5. The method according to claim 1, comprising:
   using the bill of materials to generate a demand plan with respect to the configurable product and the plurality of component products of the configurable product.

6. The method according to claim 2, comprising:
   using the consistency calculation in the disaggregation of the bill of materials.

7. A computer system for managing a supply chain, the computer system comprising:
   a processor;
   a planning tool configured to run on the processor for generating a demand plan for a configurable product in a managed supply chain; and
   a data storage system for storing data relating to the product, wherein the data includes at least one product characteristic specifying a plurality of component products and an additional characteristic specifying a selection condition relating to the at least one product characteristic,
   wherein the planning tool includes a modelling tool configured to run on the processor for generating a model of a bill of materials for the configurable product, wherein the modelling tool is operatively associated with the data storage system and the processor to combine the at least one product characteristic and the additional characteristic to generate a characteristic value combination, and to use the characteristic value combination to model the bill of materials, wherein the modeled bill of materials is used to control the supply of the product.

8. A modeller apparatus for managing a supply chain for a configurable product, wherein the configurable product has at least one product characteristic specifying a plurality of component products and an additional characteristic specifying a selection condition relating to the at least one product characteristic, the apparatus comprising:
   a storage medium storing processor readable code to model a bill of materials for the configurable product, the processor readable code combining the at least one product characteristic and the additional characteristic to generate a characteristic value combination,
   wherein the modeller apparatus uses the characteristic value combination to model the bill of materials, for purposes of controlling a supply of the configurable product.

9. The method of claim 1, comprising:
   using the bill of materials to generate a demand plan with respect to the configurable product and the plurality of component products of the configurable product, wherein the demand plan models product independent characteristics using standard demand planning and the demand plan models product dependent characteristics using characteristics-based forecasting.

10. The method of claim 5, wherein the demand plan models product independent characteristics using standard demand planning and the demand plan models product dependent characteristics using characteristics-based forecasting.

11. A method comprising:
   storing data relating to a product, wherein the data includes at least one product characteristic specifying a plurality of component products and an additional characteristic specifying a selection condition relating to the at least one product characteristic;
   combining the at least one product characteristic and the additional characteristic to generate a characteristic value combination;
   using the characteristic value combination to model a bill of materials; and
   using the modeled bill of materials to generate a demand plan with respect to the configurable product and the plurality of component products of the configurable product.

12. The method of claim 11, comprising:
   using the modeled bill of materials to control a supply of the product.

13. The method of claim 11, wherein the demand plan models product independent characteristics using standard demand planning and the demand plan models product dependent characteristics using characteristics-based forecasting.

14. The method of claim 11, comprising:
   performing a consistency calculation to model the bill of materials.

* * * * *